W. STARKEY.
Egg-Cup.

No. 201,364.  Patented March 19, 1878.

Witnesses  
Francis L. Clark  
Erwin Hartrage

Inventor  
William Starkey

UNITED STATES PATENT OFFICE.

WILLIAM STARKEY, OF PITTSBURG, PENNSYLVANIA, ASSIGNOR OF ONE-FOURTH HIS RIGHT TO ELIZA STARKEY, OF SAME PLACE.

IMPROVEMENT IN EGG-CUPS.

Specification forming part of Letters Patent No. 201,364, dated March 19, 1878; application filed February 25, 1878.

*To all whom it may concern:*

Be it known that I, WILLIAM STARKEY, of Pittsburg, in the county of Allegheny and State of Pennsylvania, have invented a new and useful Improvement in Egg-Cups; and I do hereby declare the following to be a full, clear, concise, and exact description thereof, reference being had to the accompanying drawings, making a part of this specification, in which like letters indicate like parts.

Figure 1:
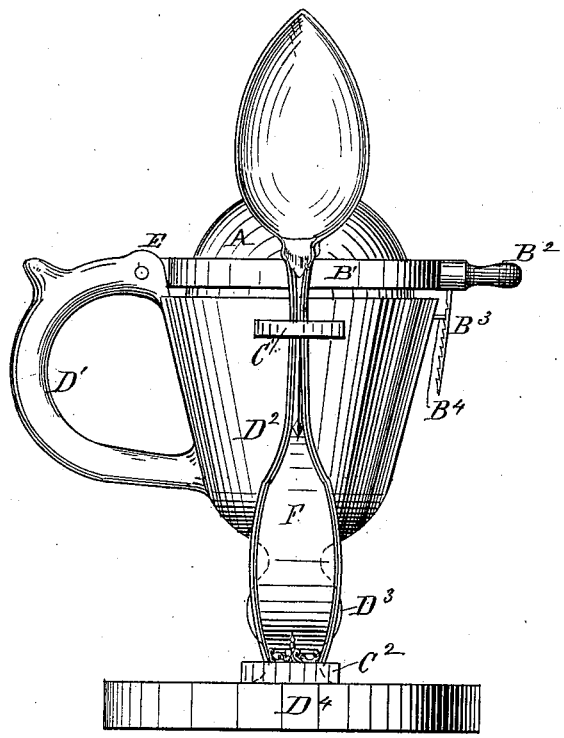
Figure 2:
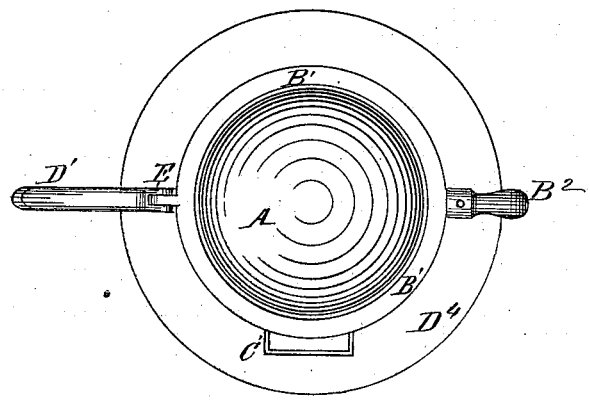

Figure 1 is a perspective view of my improvement in egg-cups. Fig. 2 is a top view of the same, and which will be described as follows:

A represents an egg in the cup. $B^1$ is the hinged curved hoop which holds the egg. $B^2$ is the handle. $B^3$ is a spring-rack, to hold the same firm to any desired point. $B^4$ is a lip or catch for the same. E is a hinge, by which $B^1$ is held in its place, and allows it to move up or down. $D^1$ is the handle of the cup. $D^2$ is the bowl of the egg-cup, which contains the egg. $D^3$ is the standard. $D^4$ is the base of the same. $C^1$ is a loop or ring to admit and hold the spoon.

In using the cup, take hold of the handle $D^1$, and with the other hand, of the handle $B^2$, with one finger under the bottom of the spring $B^3$, which will spring open and allow it to pass by the catch $B^4$ upward, and allow an egg to be placed in the cup $D^2$. Then take hold of the handle $B^2$ and bring it down upon the egg to the desired point, when the catch $B^3$ will hold it down and keep it from falling aside and spilling the same while being eaten.

Having thus described my invention, what I claim, and desire to secure by Letters Patent, is—

1. In an egg-cup, the combination of the hinged curved hoop $B^1$ and handle $B^2$, spring $B^3$, and catch $B^4$, substantially as described.

2. The combination of handle $D^1$, hinge E, loop or ring $C^1$, and cup $C^2$, on base $D^4$, to hold the spoon F, substantially as set forth.

In testimony whereof I have hereunto set my hand and seal.

WILLIAM STARKEY. [L. S.]

Witnesses:
 JAMES SHEPPARD,
 FRANCIS L. CLARK.